(Model.)

W. SPRAGUE.
MACHINE FOR CUTTING GREEN CORN OFF THE COB

No. 256,926.  Patented Apr. 25, 1882.

Witnesses:
Chas. J. Buchheit
Edw. J. Brady

Welcome Sprague Inventor.
By Wilhelm & Bonner
Attorneys.

(Model.) 4 Sheets—Sheet 2.
W. SPRAGUE.
MACHINE FOR CUTTING GREEN CORN OFF THE COB.
No. 256,926. Patented Apr. 25, 1882.
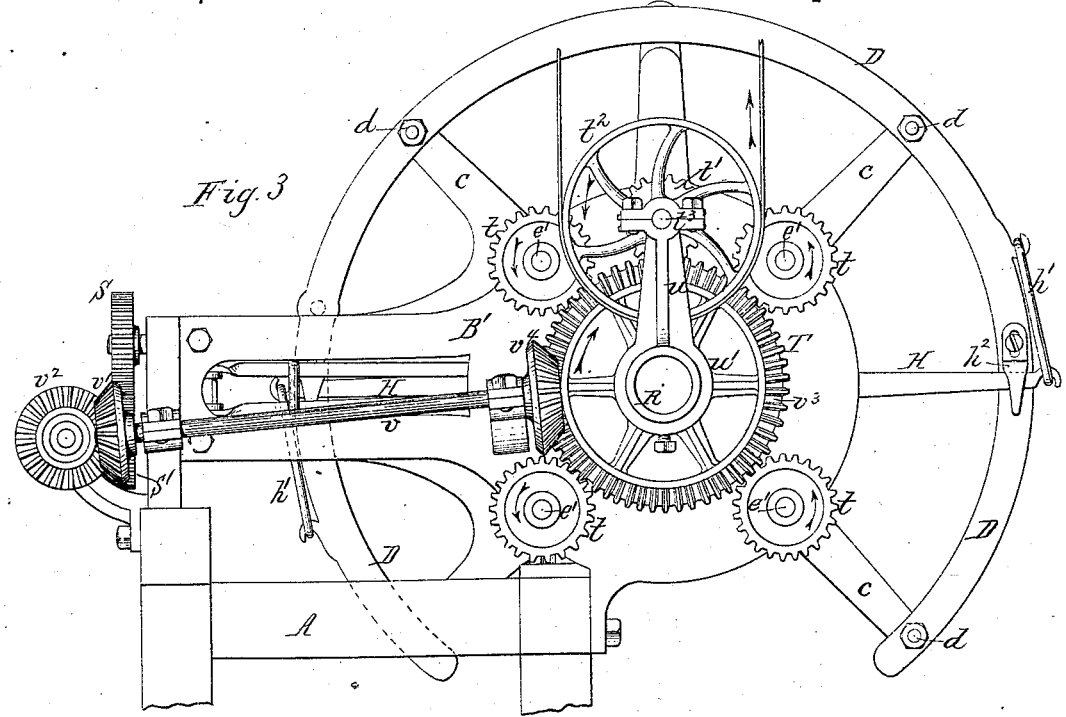
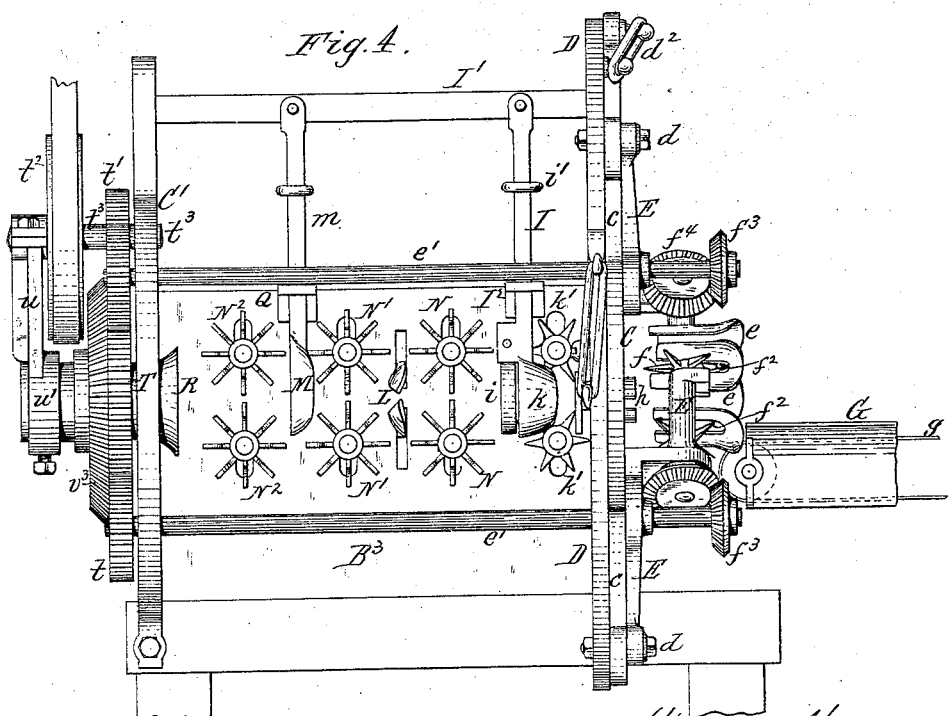
Witnesses: Chas. J. Buchheit, Edw. J. Brady
Welcome Sprague, Inventor.
By Wilhelm Bonner, Attorneys.

(Model.) 4 Sheets—Sheet 3.
W. SPRAGUE.
MACHINE FOR CUTTING GREEN CORN OFF THE COB.
No. 256,926. Patented Apr. 25, 1882.
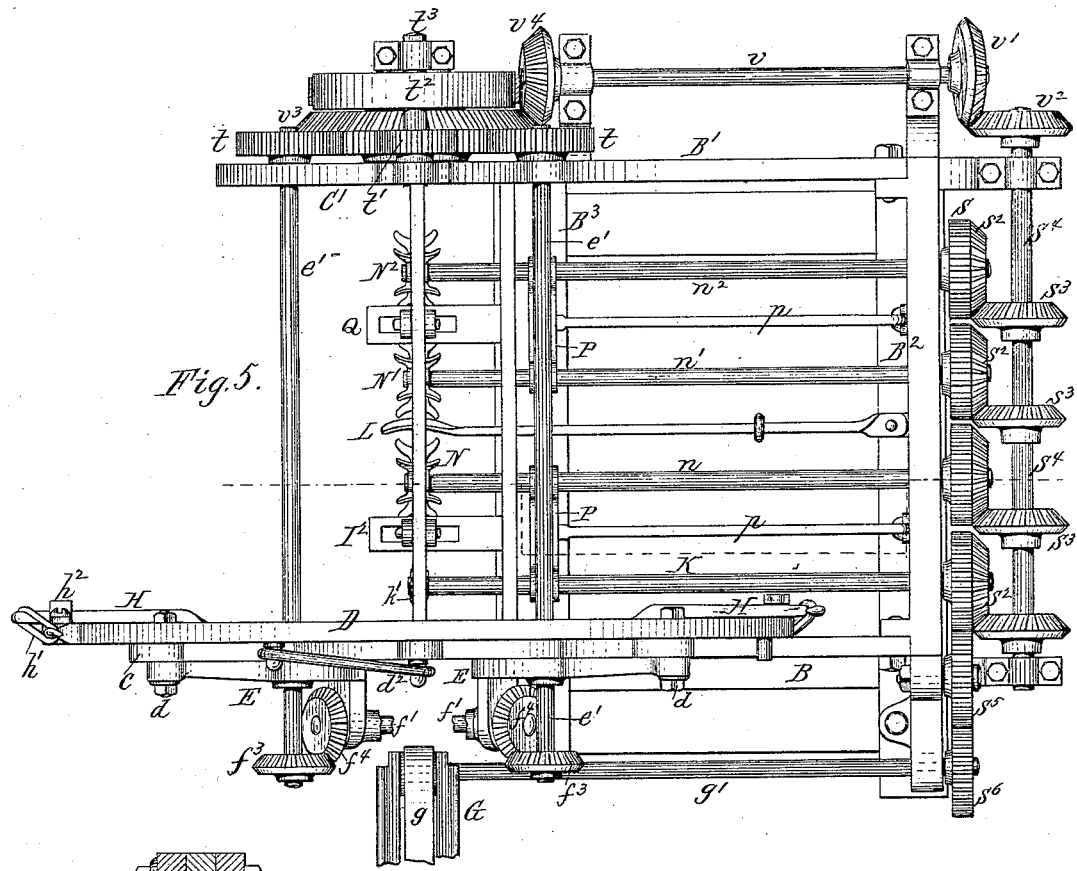
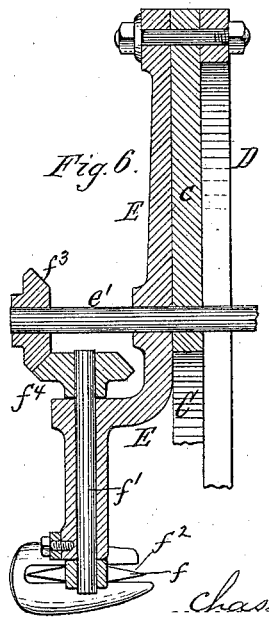
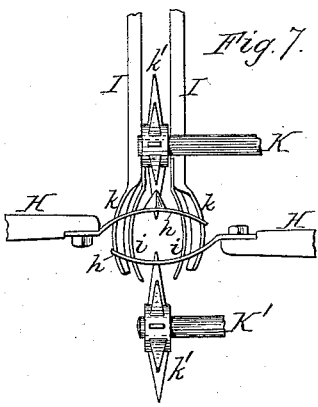
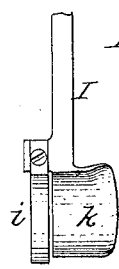
Witnesses: Chas. J. Buchheit, Edw. J. Brady
Welcome Sprague, Inventor.
By Wilhelm & Bonner, Attorneys.

(Model.)

W. SPRAGUE.

MACHINE FOR CUTTING GREEN CORN OFF THE COB.

No. 256,926.     Patented Apr. 25, 1882.

4 Sheets—Sheet 4.

Witnesses: Chas. J. Buchheit, Edw. J. Brady

Welcome Sprague, Inventor.
By Wilhelm & Bonner, Attorneys.

UNITED STATES PATENT OFFICE.

WELCOME SPRAGUE, OF FARNHAM, NEW YORK.

MACHINE FOR CUTTING GREEN CORN OFF THE COB.

SPECIFICATION forming part of Letters Patent No. 256,926, dated April 25, 1882.

Application filed January 12, 1882. (Model.)

*To all whom it may concern:*

Be it known that I, WELCOME SPRAGUE, of Farnham, in the county of Erie and State of New York, have invented new and useful Improvements in Machines for Cutting Green Corn off the Cob, of which the following is a specification.

This invention relates to that class of machines which are employed for cutting the kernels of green corn from the cob preparatory to canning the same.

In machines of this class as now generally constructed the ear of corn is driven between the knives by means of a reciprocating plunger. This construction is objectionable for the reason that the ears of corn have to be fed to the plunger exactly at the proper time and in the proper manner or the ear will be improperly driven against the knives, whereby the cutting mechanism will be injured.

The first object of my invention is to avoid these difficulties by dispensing with the plunger; and the second object of my invention is to increase the cutting and scraping capacity of the machine, so that the kernels are completely removed from the cobs before the latter are discharged from the machine.

My invention consists in the peculiar construction and combination of the feed-belt, cutters, scrapers, feed-wheels, and connecting parts of the machine, as will be hereinafter fully set forth.

Figure 1:
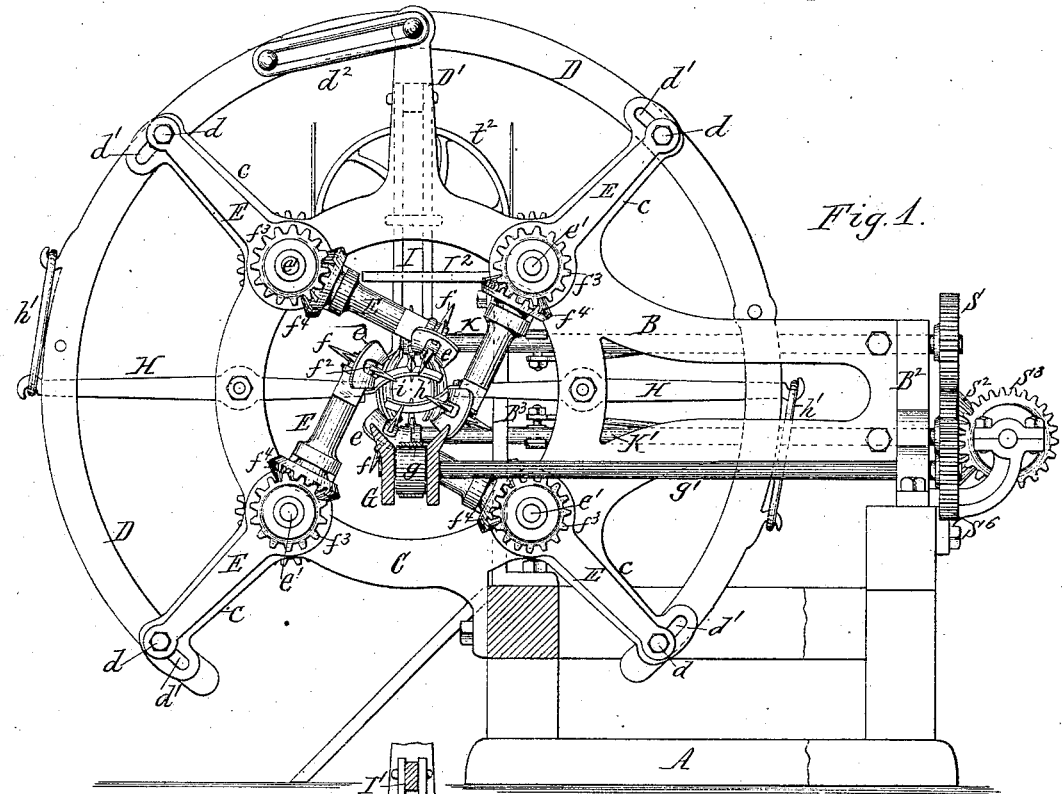
Figure 2:
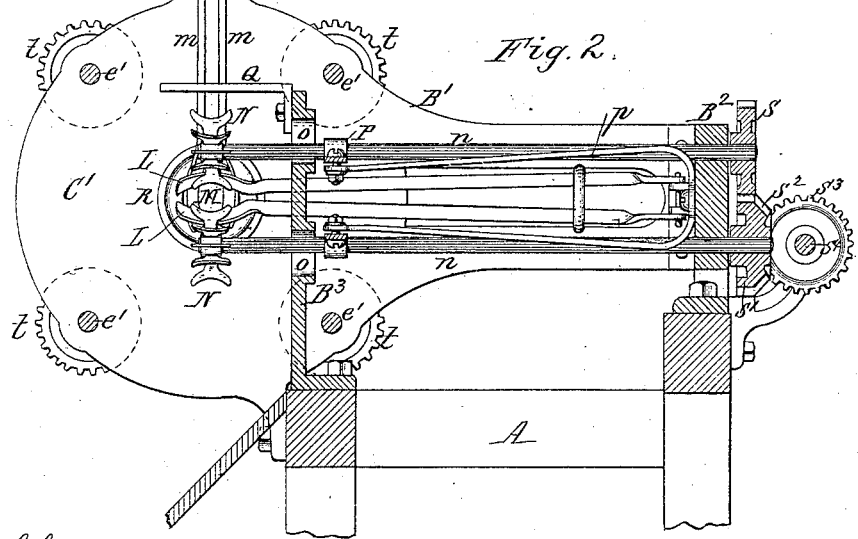
Figure 9:
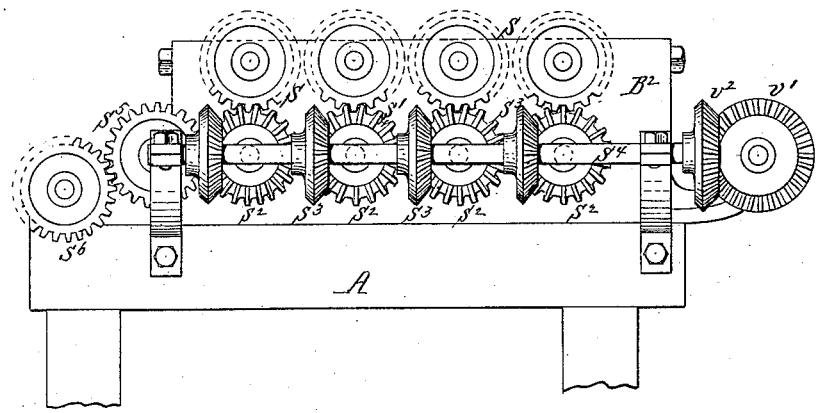
Figure 10:
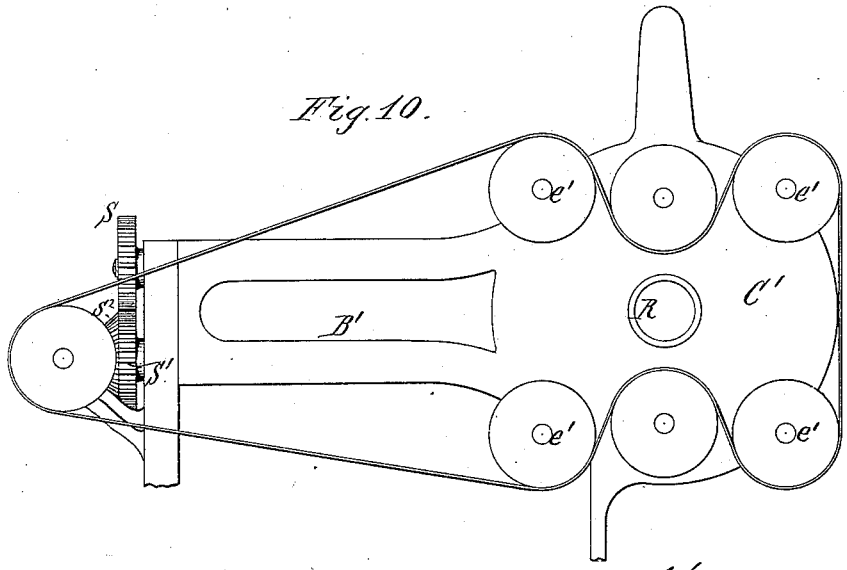

In the accompanying drawings, consisting of four sheets, Figure 1 is a front elevation of my improved machine with the feed-trough removed. Fig. 2 is a cross-section of the machine in rear of the cutter-head. Fig. 3 is a rear elevation, and Fig. 4 a side elevation, of the machine. Fig. 5 is a top plan view of the machine. Fig. 6 is a longitudinal section, on an enlarged scale, of one of the arms to which the guide-plates and feed-wheels are attached. Fig. 7 is a front elevation, on an enlarged scale, of the knives. Fig. 8 is a side elevation of the rear knives. Fig. 9 is a side elevation of the machine, showing the driving mechanism. Fig. 10 is a rear elevation, showing a modified construction of the driving mechanism.

Like letters of reference refer to like parts in the several figures.

A represents the base of the machine. B is the front frame, B' the rear frame, and $B^2$ $B^3$ the side frames which connect the frames B and B', the four frames constituting a rigid frame-work, in which the operative parts of the machine are supported and which rests upon the base A. The front frame, B, is provided with a stationary ring, C, arranged concentric with and at right angles to the line in which the ears of corn travel through the machine, and which is secured to or formed in one piece with the frame B. The rear frame, B', is provided with a similar ring or perforated plate, C', the center of which is arranged in line with that of the ring C.

D represents a movable ring or ring-segment which surrounds the ring C, and which is connected to radial arms $c$, projecting from the ring B, by bolts $d$, which move in concentric slots $d'$ formed in the ends of the arms $c$, and made sufficiently long to permit of the requisite oscillatory movement of the outer ring, D.

$e$ represents four curved guide-plates attached to the inner ends of four arms, E, which are arranged on the front side of the ring C, equidistant around the center thereof. The arms E are pivoted to the ring C by four horizontal shafts, $e'$, which are journaled in the rings C and C'.

$f$ represents a pointed, serrated, or toothed feed-wheel, arranged at the inner end of each arm E, and mounted on a shaft, $f'$, which turns in a bore or socket formed in the inner portion of the arm. The feed-wheels $f$ are arranged radially around the center of the ring C, and project inwardly through slots $f^2$ formed in the guide-plates $e$. The shafts $f'$, to which the feed-wheels $f$ are secured, are driven from the horizontal shafts $e'$ by bevel-wheels $f^3 f^4$. The outer ends of the arms E extend to the ring D, and are connected therewith by the bolts $d$, which pass through the slots $d'$, so that an oscillatory movement of the ring D will cause all of the arms E to turn simultaneously on the shafts $e'$. The outer ring, D, is connected with a fixed arm, D', of the inner ring, C, by a spring, $d^2$, which becomes strained by a movement of the outer ring, D, in the direction in which it causes the feed-wheels to recede from the center of the ring, whereby the ring D receives a tendency to return to the position in which the feed-wheels are nearest the center of the ring C.

G represents the feed-trough, arranged in front of the machine in line with the guide-plates $e$; and $g$ is an endless apron or feed-belt, arranged with its upper portion in the trough G and moving with its upper portion toward the guide-plates $e$. The belt is driven by a horizontal shaft, $g'$, or any other suitable means. The ears of corn are successively placed upon the feed-belt and carried by the latter between the guide-plates $e$ and feed-wheels $f$.

$h\ h$ represent two curved or crescent-shaped cutters arranged immediately behind the guide-plates $e$, above and below the center of the ring C. They are attached to arms H, which are pivoted to the stationary ring C, and connected with their outer ends to the movable ring D by springs $h'$, which draw the outer ends of the arms H against shoulders, stops, or offsets $h^2$, formed on or secured to the rear side of the ring D. The stops $h^2$ bear against the arms H in the direction in which the rotary motion of the ring D causes the cutters to separate, while the springs $h'$ tend to close the cutters. The latter open therefore against the pressure of the springs $h'$, and if from any cause the cutters should be required to separate farther than the guide-plates $e$ provide for the cutters can so separate independent of the guide-plates and the ring D. The ear of corn entering between the guide-plates $e$ causes the latter and the feed-wheels $f$ attached thereto to separate. The movement of all the guide-plates and feed-wheels is rendered simultaneous by their connection with the outer ring, D. The latter being also connected to the arms H, to which the cutters $h$ are attached, the cutters $h$ take part in this movement of the feed-plates and are controlled thereby. If, however, the guide-plates $e$ should approach each other by reason of a thinner portion of the ear entering between them while the larger portion of the ear is still between the cutters, the latter will not close, but remain separate by reason of the yielding connections whereby the cutter-arms are attached to the outer ring, D.

$i\ i$ are two similar cutters arranged in an upright position in rear of the cutters $h\ h$, and attached to arms I, which are secured with their upper ends to a longitudinal piece, $I'$, which connects the rings C and C'. The arms I may be made elastic, with a tendency to close the cutters, or they may be drawn together by a spring, $i'$.

$k$ represents a guide-plate attached to each arm I in front of each cutter, for the purpose of guiding the ear of corn from the front cutters, $h$, to the rear cutters, $i$.

$I^2$ represents a guide-bracket secured to the side frame, $B^3$, and provided with openings in which the arms I move.

$k'\ k'$ represent two vertical feed-wheels arranged between the cutters $h$ and $i$, respectively above and below the path of the ear of corn, and provided with pointed teeth or spurs similar to those formed on the feed-wheels $f$. The wheels $k'$ are mounted on horizontal shafts K K', journaled in the side frames, $B^2\ B^3$.

L L represent two crescent-shaped scrapers arranged horizontally respectively above and below the horizontal line in which the ears of corn move, and M M represent a pair of similar scrapers arranged vertically on opposite sides of said line. The front or operative sides of the scrapers L and M are concave and incline backwardly, whereby the centering of the ears is facilitated and the scrapers caused to press firmly against the cob and remove therefrom those portions of the kernels which have not been removed by the cutters. The succeeding pairs of cutters and scrapers operate upon all portions of the ears and completely remove the kernels therefrom.

N N represent a pair of vertical feed-wheels arranged between the cutters $i\ i$ and scrapers L L. $N'\ N'$ is a similar pair of feed-wheels placed between the scrapers L L and M M, and $N^2\ N^2$ a similar pair of feed-wheels arranged in rear of the scrapers M M. The feed-wheels N N' N² are constructed with radial arms having their ends provided with curved or V-shaped notches or depressions, the sides of which straddle the cobs. The feed-wheels N N' N² are mounted respectively on horizontal shafts $n\ n'\ n^2$, journaled in the side frames, $B^2\ B^3$. The journal-boxes of the shafts of the upper feed-wheels, $k'\ N\ N'\ N^2$, are made movable in vertical slots $o$ in the side frame, $B^3$, so that the feed-wheels can adjust themselves to the ear of corn which passes between them. As shown in the drawings, the upper feed-wheels are held down by springs or elastic arms $p$, which are secured to the side frame, $B^2$, and which bear upon the shafts of the upper feed-wheels near the side frame, $B^3$, each spring being provided at its free end with a cross-head, P, which bears upon two adjacent shafts, whereby one spring is made to answer for two shafts. Any other suitable device whereby the upper feed-wheels are given a tendency to return automatically to their lowest position may, however, be employed.

Q represents a slotted guide-bracket constructed like the bracket $I^2$, whereby the arms $m$ of the scrapers M are guided and steadied.

R represents a horizontal tube or sleeve, which is secured centrally in the ring C', and through which the cobs are discharged from the machine.

S represents gear-wheels secured to the rear ends of the shafts of the upper feed-wheels, and S' are similar gear-wheels secured to the shafts of the lower feed-wheels and meshing with the wheels S.

$S^2$ are bevel-wheels formed with or secured to the wheels S', and gearing with bevel-wheels $S^3$, mounted on a horizontal counter-shaft, $S^4$.

$S^5$ and $S^6$ represent two gear-wheels whereby motion is imparted to the horizontal shaft $g'$, which drives the feed-belt $g$.

T is a spur-wheel which turns loosely upon the sleeve R, and which meshes with four gear-wheels, $t$, mounted on the rear ends of the horizontal shafts $e'$. Motion is imparted to the gear-wheel T by a pinion, $t'$, and pulley $t^2$, which are mounted upon an arbor, $t^3$. The latter is secured to an arm, $u$, which is provided with a collar, $u'$, whereby the arm $u$ is secured to the outer portion of the sleeve R by a set-screw or other suitable means, the collar $u'$ serving at the same time to retain the wheel T on the sleeve R. Power is applied to the pulley $t^2$ by an endless belt so that the shafts $e'$ and the shafts of the feed-wheels $k'$ N N' N$^2$ are caused to turn in a direction in which the adjacent faces of the feed-wheels are turned—i. e., inwardly—so as to propel the ears of corn through the machine from front to rear. The shaft S$^4$ is driven from the gear-wheel T by a counter-shaft, $v$, which turns the shaft S$^4$ by bevel-wheels $v'$ $v^2$, and which receives motion from a bevel-wheel, $v^3$, secured to the side of the wheel T and meshing with a pinion, $v^4$, on the shaft $v$. An endless belt may, however, be employed for driving the shafts $e'$ from the shaft S$^4$, in which case suitable pulleys are mounted on the rear ends of the shafts $e'$ and idler-pulleys are interposed between the two upper and the two lower pulleys, as represented in Fig. 10; but I prefer the gear mechanism first described, because it is more certain and reliable than the belt mechanism.

The ear of corn is placed with its point forward upon the feed-belt $g$, which introduces the ear between the guides $e$, whereby the ear is centered and conducted between the feed-wheels $f$. The latter seize the ear and force it through between the cutters $h$, whereby the outer portions of the kernels are cut off on the upper and lower sides of the ear. The feed-wheels $k'$ now seize the ear and force it between the cutters $i\,i$, whereby the outer portions of the remaining kernels are cut off. The ear is then successively seized by the feed-wheels N N' N$^2$ and carried between the scrapers L and M, whereby the portions of the kernels still adhering to the cob are removed therefrom. In this manner the ear of corn is propelled through the machine and cut or scraped alternately on opposite sides, and the cob freed from the kernels is finally discharged through the sleeve R into a suitable receptacle. The cutters, scrapers, and feed-wheels adjust themselves automatically to ears of different sizes, and the feed-wheels are arranged so closely together that an ear of average length will always be firmly seized by one pair of feed-wheels before it is released by the preceding pair. The slots $f^2$ in the guide-plates $e$ serve to remove from the feed-wheels $f$ any fragments of kernels which may adhere to the wheels. The ears of corn will be properly fed to the knives by simply placing them point forward on the feed-belt.

It is not necessary in this machine to time the placing of the ears on the feed-belt, as is the case in machines employing plungers which have a regular reciprocating movement. If, by accident or inadvertence, an ear should be presented to the feed-wheels at such an angle that they cannot straighten the ear and force it between the knives, the motion of the ear will be arrested and the wheels and the feed-belt will slip without causing injury to the knives.

I am aware that feed-belts have been used in connection with corn-shellers, and I do not broadly claim such feed-belts; but

I claim as my invention—

1. In a machine for cutting green corn from the cob, the combination, with self-adjusting cutters, of an endless feed-belt, $g$, and feed-wheels $f$, arranged between the feed-belt and the cutting mechanism, substantially as set forth.

2. In a machine for cutting green corn from the cob, the combination, with self-adjusting cutters and scrapers, of a feed-trough, G, and endless feed-belt $g$, arranged in said trough, with its upper portion exposed to receive the ears of corn, substantially as set forth.

3. The combination, with the self-adjustable cutters $h$, of self-adjustable feed-wheels $f$, mounted on swinging arms E, substantially as set forth.

4. The combination, with the cutters $h\,i$ and scrapers L M, arranged in rear of the cutters, of feed-wheels arranged between the several sets of cutters and scrapers, substantially as set forth.

5. In a machine for cutting green corn, the combination, with the cutting mechanism, of a feed-belt and feed-wheels, whereby the ears are fed between the cutters, and of feed-wheels and scrapers arranged in rear of the cutters, substantially as set forth.

6. The combination, with the stationary ring C and movable ring D, of the arms E, pivoted to the ring C and attached with their outer ends to the ring D, and guide-plates $e$ and feed-wheels $f$, mounted on the inner ends of the arms E, substantially as set forth.

7. The combination, with the stationary ring C and movable ring D, of guide-plates $e$ and feed-wheels $f$, mounted on adjustable arms E, and cutters $h$, mounted on adjustable arms H, substantially as set forth.

8. The combination, with the stationary ring C and movable ring D, of guide-plates $e$ and feed-wheels $f$, mounted on arms E, cutters $h$, mounted on arms H, and springs $h'$ and shoulders $h^2$, whereby the arms H are connected with the ring D, substantially as set forth.

9. The combination, with the arms E, of the shafts $e'$, on which said arms turn, shafts $f'$, supported in the arms E, feed-wheels $f$, secured to the inner ends of the shafts $f'$, and gear-wheels $f^3$ $f^4$, whereby the shafts $e'$ $f'$ are connected, substantially as set forth.

10. The combination, with the feed-wheels $f$, of guide-plates $e$, provided with slots $f^2$, through which the feed-wheels project, substantially as set forth.

11. The combination, with the cutting and scraping mechanism, of feed-wheels k' N N' N², made self-adjusting toward and from each other, substantially as set forth.

12. The combination, with the ring C', of the sleeve R, secured thereto, shafts e', whereby the feed-wheels f are driven, and a gear-wheel, T, turning on the sleeve R and meshing with wheels t, mounted on the rear ends of the shafts e', substantially as set forth.

WELCOME SPRAGUE.

Witnesses:
    JNO. J. BONNER,
    EDW. J. BRADY.